(12) United States Patent
Zaus et al.

(10) Patent No.: US 11,811,856 B2
(45) Date of Patent: Nov. 7, 2023

(54) DETERMINING A COMMON APPLICATION CONTEXT RELOCATION METHOD FOR EDGE COMPUTING

(71) Applicant: Apple Inc., Cupertino, CA (US)

(72) Inventors: Robert Zaus, Munich (DE); Mona Agnel, Valbone (FR); Mikhail Wilhelm, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/658,138

(22) Filed: Apr. 6, 2022

(65) Prior Publication Data

US 2022/0321673 A1    Oct. 6, 2022

Related U.S. Application Data

(60) Provisional application No. 63/171,512, filed on Apr. 6, 2021.

(51) Int. Cl.
*G06F 15/16* (2006.01)
*H04L 67/10* (2022.01)

(52) U.S. Cl.
CPC .................. *H04L 67/10* (2013.01)

(58) Field of Classification Search
CPC ........................................ H04L 67/10
See application file for complete search history.

(56) References Cited

U.S. PATENT DOCUMENTS

| | | | |
|---|---|---|---|
| 2022/0015018 A1* | 1/2022 | Kim | H04W 36/0033 |
| 2022/0030063 A1* | 1/2022 | Gupta | H04L 67/1095 |
| 2022/0053602 A1* | 2/2022 | Kim | H04W 76/22 |
| 2022/0369218 A1* | 11/2022 | Gupta | H04W 8/18 |
| 2023/0053805 A1* | 2/2023 | Kim | H04W 60/06 |

* cited by examiner

*Primary Examiner* — Padma Mundur
(74) *Attorney, Agent, or Firm* — Fay Kaplun & Marcin, LLP (57) ABSTRACT

A user equipment (UE) is configured to operate as an edge enabler client (EEC) and is configured to determine one or more application context relocation (ACR) methods supported by an application client (AC) of the UE and transmit, to an edge data network (EDN), a message comprising a first indication that the AC requires service continuity support, a second indication of one or more ACR methods supported by the AC and a third indication of one or more ACR methods supported by the EEC.

17 Claims, 8 Drawing Sheets

| Bit | ACR methods |
|---|---|
| | If bit 'n' is set to 1, this indicates support of the following ACR method. If the respective bit is set to 0, it indicates the ACR method is not supported. |
| 1 | Initiation by EEC using regular EAS Discovery |
| 2 | EEC executed application context relocation via S-EES |
| 3 | Source EAS decided application context relocation scenario |
| 4 | Source EES executed application context relocation |
| 5 | EEC executed application context relocation via T-EES |

| Bit | ACR methods<br>If bit 'n' is set to 1, this indicates support of the following ACR method. If the respective bit is set to 0, it indicates the ACR method is not supported. |
|---|---|
| 1 | Initiation by EEC using regular EAS Discovery |
| 2 | EEC executed application context relocation via S-EES |
| 3 | Source EAS decided application context relocation scenario |
| 4 | Source EES executed application context relocation |
| 5 | EEC executed application context relocation via T-EES |

Fig. 5

| 8 | 7 | 6 | 5 | 4 | 3 | 2 | 1 | |
|---|---|---|---|---|---|---|---|---|
| Supported ACR methods IEI ||||||||  octet 1 |
| Length of Supported ACR methods contents |||||||| octet 2 |
| Spare 0 | Spare 0 | Spare 0 | Meth. 5 | Meth. 4 | Meth. 3 | Meth. 2 | Meth. 1 | octet 3 (highest preference) |
| Spare 0 | Spare 0 | Spare 0 | Meth. 5 | Meth. 4 | Meth. 3 | Meth. 2 | Meth. 1 | octet 4 ($2^{nd}$ highest preference) |
| Spare 0 | Spare 0 | Spare 0 | Meth. 5 | Meth. 4 | Meth. 3 | Meth. 2 | Meth. 1 | octet 5 ($3^{rd}$ highest preference) |
| ... | ... | ... | ... | ... | ... | ... | ... | ... |
| Spare 0 | Spare 0 | Spare 0 | Meth. 5 | Meth. 4 | Meth. 3 | Meth. 2 | Meth. 1 | octet n ($n^{th}$ highest preference) |

Fig. 6a

| 8 | 7 | 6 | 5 | 4 | 3 | 2 | 1 | |
|---|---|---|---|---|---|---|---|---|
| \multicolumn{8}{|c|}{Supported ACR methods IEI} | octet 1 |
| \multicolumn{8}{|c|}{Length of Supported ACR methods contents} | octet 2 |
| Spare 0 | Spare 0 | Spare 0 | 1 | 0 | 0 | 1 | 1 | octet 3 (highest preference) |
| Spare 0 | Spare 0 | Spare 0 | 0 | 1 | 1 | 0 | 0 | octet 4 ($2^{nd}$ highest preference) |

Fig. 6b

| 8 | 7 | 6 | 5 | 4 | 3 | 2 | 1 | |
|---|---|---|---|---|---|---|---|---|
| \multicolumn{8}{|c|}{Supported ACR methods IEI} | octet 1 |
| \multicolumn{8}{|c|}{Length of Supported ACR methods contents} | octet 2 |
| Spare 0 | Spare 0 | Spare 0 | 0 | 0 | 0 | 1 | 1 | octet 3 (highest preference) |
| Spare 0 | Spare 0 | Spare 0 | 0 | 1 | 0 | 0 | 0 | octet 4 (2nd highest preference) |
| Spare 0 | Spare 0 | Spare 0 | 1 | 0 | 0 | 0 | 0 | octet 5 (3rd highest preference) |

Fig. 6c

DETERMINING A COMMON APPLICATION CONTEXT RELOCATION METHOD FOR EDGE COMPUTING

PRIORITY CLAIM/INCORPORATION BY REFERENCE

This application claims priority to U.S. Provisional Application Ser. No. 63/171,512 filed on Apr. 6, 2021, and entitled, "Method to Determine a Common Application Context Relocation Method for Edge Computing," the entirety of which is incorporated by reference herein.

BACKGROUND

A user equipment (UE) may connect to an edge data network to access edge computing services. Edge computing refers to performing computing and data processing at the network where the data is generated. Once connected, application data may flow between the UE and an edge application server (EAS) of the edge data network. When the UE is connected to an EAS, for any of a variety of different reasons, a scenario may occur where a different EAS is more suitable to serve the UE. The UE and the edge data network may support mechanisms, such as application context relocation (ACR), configured to provide service continuity at the UE when the currently serving EAS is replaced with a new EAS.

SUMMARY

Some exemplary embodiments are related to a processor of a user equipment (UE) operating as an edge enabler client (EEC). The processor is configured to perform operations including determining one or more application context relocation (ACR) methods supported by an application client (AC) of the UE and transmitting, to an edge data network (EDN), a message comprising a first indication that the AC requires service continuity support, a second indication of one or more ACR methods supported by the AC and a third indication of one or more ACR methods supported by the EEC.

Other exemplary embodiments are related to an edge enabler server (EES) of an edge data network (EDN) configured to perform operations including receiving, from one or more edge application servers (EAS), a first message indicating whether each EAS supports service continuity and one or more application context relocation (ACR) methods supported by each of the EASs that support service continuity and receiving, from an edge enabler client (EEC) of a user equipment (UE), a second message indicating that an application client (AC) of the UE requesting service from the EDN requires service continuity support from the EDN, one or more ACR methods supported by the AC and one or more ACR methods supported by the EEC.

Still further exemplary embodiments are related to an edge configuration server (ECS) configured to perform operations including receiving, from one or more edge enabler servers (EESs), a first message comprising a first indication indicating whether each EES supports service continuity and one or more application context relocation (ACR) methods supported by each of the EESs that support service continuity, receiving, from an edge enabler client (EEC) of a user equipment (UE), a second message that an application client (AC) of the UE requesting service from one or more edge data networks (EDN) requires service continuity support from the one or more EDNs, one or more ACR methods supported by the AC and one or more ACR methods supported by the EEC and transmitting, to the EEC, a third message comprising each EES that supports service continuity and one or more ACR methods supported by the EES.

DETAILED DESCRIPTION

The exemplary embodiments may be further understood with reference to the following description and the related appended drawings, wherein like elements are provided with the same reference numerals. The exemplary embodiments relate to application context relocation (ACR) for edge computing. As will be described in more detail below, ACR refers to an end-to-end procedure where application context is transferred from a source edge application server (s-EAS) to a target EAS (t-EAS). The ACR procedure may involve one or more entities on the user equipment (UE) side and one or more entities on the network side. However, there are multiple different types of ACR methods that may be incompatible with one another. In one aspect, the exemplary embodiments introduce mechanisms to determine a method for ACR that is supported by the UE and network entities involved in the ACR. In another aspect, the exemplary embodiments introduce mechanisms that enable the UE to make determinations related to establishing and maintaining a connection with an edge data network that considers the capabilities of different entities regarding their support of particular ACR methods.

The exemplary embodiments are described with regard to a user equipment (UE). However, reference to a UE is merely provided for illustrative purposes. The exemplary embodiments may be utilized with any electronic component that is configured with the hardware, software, and/or firmware to exchange information and data with the network. Therefore, the UE as described herein is used to represent any appropriate electronic component.

The exemplary embodiments are also described with regard to a fifth generation (5G) New Radio (NR) network. However, reference to a 5G NR network is merely provided for illustrative purposes. The exemplary embodiments may be utilized with any network that allows the UE to access an edge data network.

The UE may access the edge data network via the 5G NR network. The edge data network may provide the UE with access to edge computing services. Those skilled in the art will understand that edge computing refers to performing computing and data processing at the network where the data is generated. In contrast to legacy approaches that utilize a centralized architecture, edge computing is a distributed approach where data processing is localized towards the network edge, closer to the end user. This allows performance to be optimized and latency to be minimized.

An application client (AC) running on the UE may connect to an EAS of an edge data network to receive edge computing services. Once connected, application data traffic may flow between the AC of the UE and the EAS of the edge data network. However, for any of a variety of different reasons, a scenario may occur where a different EAS is more suitable to serve the UE. The UE and the edge data network may support mechanisms, such as ACR, to provide service continuity at the UE when the currently serving EAS is replaced with a new EAS.

A serving EAS may perform various operations including, but not limited to, storing application context for the AC of the UE. Throughout this description, the term "application context" may refer to a set of data related to an AC of the UE that is stored by a serving EAS. The set of data may relate to one or more tasks that are to be performed by the EAS on behalf of the AC. To provide some examples, application context may comprise data such as, but not limited to, a compression context, an intermediate result of a computation task or a representation of a three-dimensional virtual scenery (e.g., extended reality (XR), etc.). However, any reference to an instance of application context comprising a particular type of data or task is merely provided for illustrative purposes. In an actual operating scenario, a specific instance of application context may be dependent on the type of application, the type of tasks the EAS is to perform for the AC and/or any other appropriate factor.

The UE may be equipped with one or more ACs and each AC may connect to one or more EASs from one or more edge data networks. Throughout this description, a "serving EAS" may refer to an EAS that is configured to provide the UE with access to edge computing services. As indicated above, during operation, a serving EAS may be replaced with a new EAS that is to continue to provide the AC of the UE with access to edge computing services. When a serving EAS is replaced with a different EAS, service interruptions may occur that negatively impact the user experience associated with the UE, the application and/or the mobile network. However, the UE and the edge data network may support service continuity mechanisms, such as ACR, that are configured to minimize application layer service interruptions.

To provide a general example, consider a scenario in which the UE is connected to a serving EAS ("EAS-1") and moves to a new location within the mobile network (e.g., a mobility event). The new location may cause latency issues for EAS-1 and a different EAS ("EAS-2") may be more suitable to serve the AC of the UE. In this example, EAS-1 may be replaced with EAS-2 which is geographically closer to the new location and thus, less likely to cause latency issues. To minimize service interruption, an ACR procedure may be performed to transfer the application context from EAS-1 to EAS-2. However, the above referenced mobility scenario is merely provided for illustrative purposes. A serving EAS may be replaced by a new EAS as a result of any appropriate type of mobility event or non-mobility event.

As mentioned above, ACR may be used to provide service continuity when a currently serving EAS is replaced with a new EAS. Those skilled in the art will understand that ACR refers to an end-to-end service continuity procedure that may include an application context transfer (ACT). An ACT may refer to the transfer of application context between a source EAS (s-EAS) and a target EAS (t-EAS). Throughout this description, reference to an EAS or other entity as a "source" or a "target" is intended to identify a role in an ACR procedure. Additional details regarding the ACR, ACT and the roles a source entity (e.g., s-EAS, etc.) and target entity (e.g., t-EAS) may perform are described in more detail below.

In addition to an EAS, an ACR procedure may involve an AC of the UE, an edge enabler client (EEC) of the UE, a source edge enabler server (s-EES), a s-EAS, a target EES (t-EES) and a t-EAS. Those skilled in the art will understand that an EEC may perform operations in support of the AC and an EES may be configured to provide supporting functions to the EAS and the EEC running on the UE. Additional details regarding the AC, EEC, EES and EAS are provided below with regard to the network arrangement 100 of FIG. 1, the UE 110 of FIG. 2 and the architecture 300 for enabling edge applications of FIG. 3.

There may be multiple different types of methods for ACR procedures. The procedures may be different with regard to which entity is responsible for initiating the procedure, the tasks each entity is to perform and/or the sequence in which the tasks are performed. A successful ACR procedure may occur when all of the entities involved support a common ACR method. In one aspect, it has been identified that there is a need for mechanisms to determine an ACR method that is supported by all the entities involved in the ACR procedure (e.g., AC, EEC, s-EES, s-EAS, t-EEs, t-EAS, etc.). In another aspect, it has also been identified that it may be beneficial to consider the capabilities of different entities regarding their support of specific ACR methods when the UE initially selects an EES and/or EAS for access to edge computing services and when the UE (or s-EES) selects a t-EES and t-EAS for ACR. The exemplary embodiments described herein introduce solutions for these aspects of ACR. The exemplary embodiments may be utilized independently from one another, in conjunction with currently implemented edge computing mechanisms, future implementations of edge computing mechanisms or independently from other edge computing mechanisms.

Figure 1:
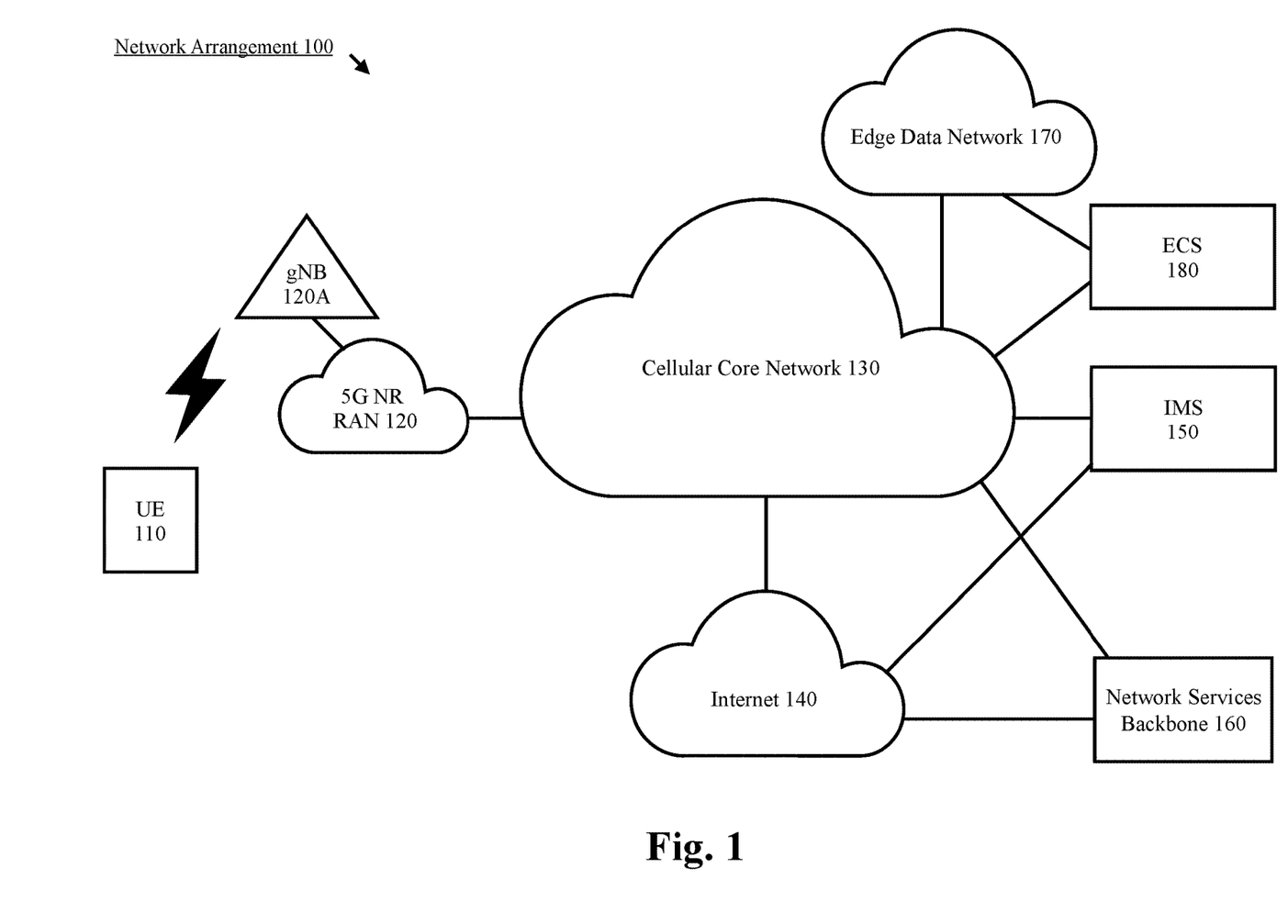
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a wireless local area network (WLAN), etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, I-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR RAN 120. For example, as indicated above, the 5G NR RAN 120 may be associated with a particular cellular provider where the UE 110 and/or the user thereof has a contract and credential information (e.g., stored on a SIM). Upon detecting the presence of the 5G NR RAN 120, the UE 110 may transmit the corresponding credential information to associate with the 5G NR RAN 120. More specifically, the UE 110 may associate with a specific base station (e.g., gNB 120A).

The network arrangement 100 also includes a cellular core network 130, the Internet 140, an IP Multimedia Subsystem (IMS) 150, and a network services backbone 160. The cellular core network 130 may be considered as an interconnected set of components or functions that manage the operation and traffic of the cellular network. The cellular core network 130 manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

In addition, the network arrangement 100 includes an edge data network 170 and an edge configuration server (ECS) 180. The edge data network 170 and the ECS 180 will be described in more detail below with regard to FIG. 3. Those skilled in the art will understand that an actual network arrangement may include any appropriate number of edge data networks and ECSs. Thus, the example of a single edge data network 170 and single ECS 180 is merely provided for illustrative purposes.

Figure 2:
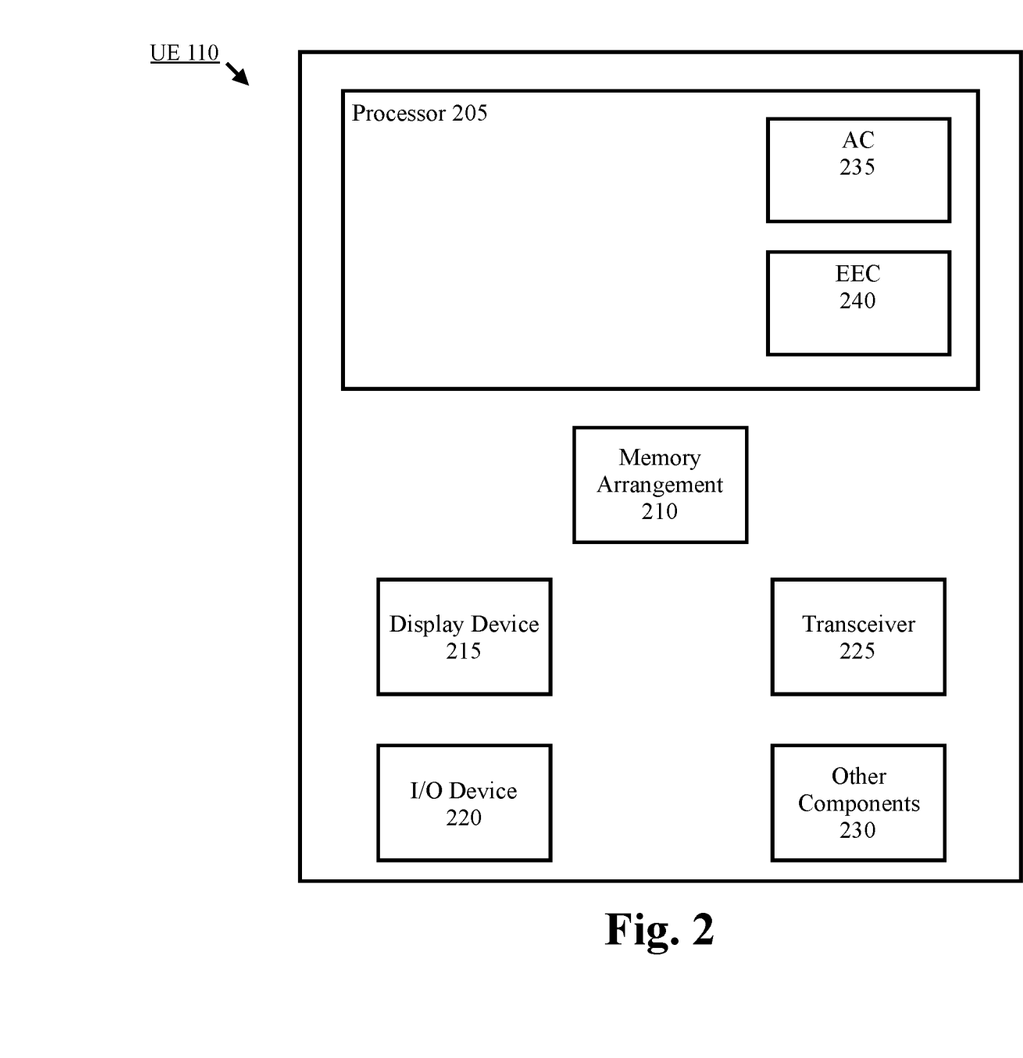
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute various types of software. For example, the processor may execute an application client (AC) 235 and an edge enabler client (EEC) 240. The AC 235 may perform operations related to exchanging application data with a server via a network. The EEC 240 may perform operations in support of the AC 235. Reference to a single AC 235 and EEC 240 is merely provided for illustrative purposes. The UE 110 may be equipped with any appropriate number of ACs supported by any appropriate number of EECs. The AC 235 and the EEC 240 are discussed in more detail below with regard to FIG. 3.

The above referenced software being executed by the processor 205 is only exemplary. The functionality associated with the software may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
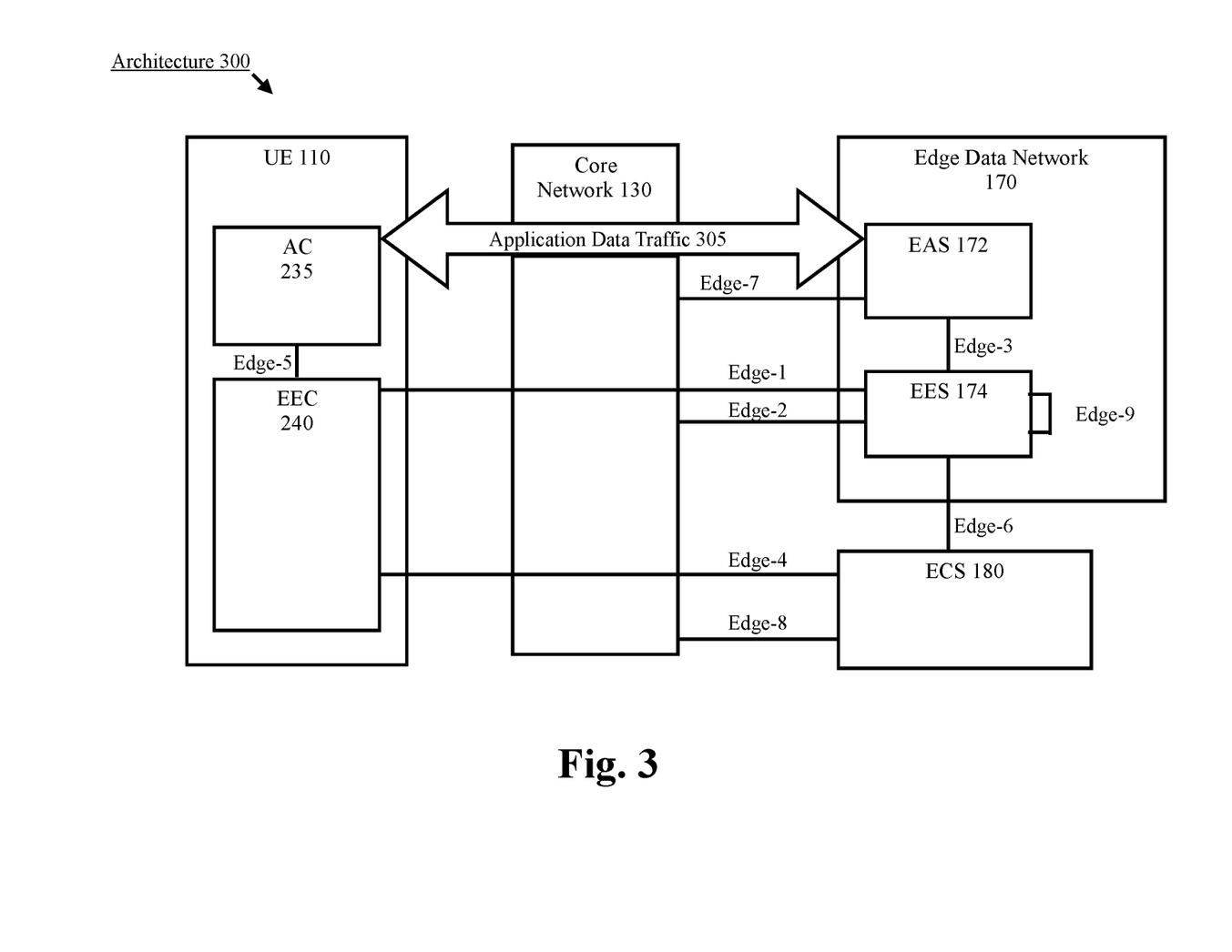
FIG. 3 shows an architecture for enabling edge applications according to various exemplary embodiments.

FIG. 3 shows an architecture 300 for enabling edge applications according to various exemplary embodiments. The architecture 300 will be described with regard to the network arrangement 100 of FIG. 1 and the UE 110 of FIG. 2.

The architecture 300 provides an example overview of the application layer architecture for enabling edge applications. The architecture 300 includes the UE 110, the core network 130 and the edge data network 170. The UE 110 may establish a connection to the edge data network 170 via the core network 130 and various other components (e.g., gNB 120A, the 5G NR RAN 120, network functions, etc.).

In the architecture 300, the various components are shown as being connected via reference points labeled edge-x (e.g., edge-1, edge-2, edge-3, edge-4, edge-5, edge-6, edge-7, edge-8, edge-9, etc.). Those skilled in the art will understand that each of these reference points (e.g., connections, interfaces, etc.) are defined in the 3GPP Specifications. In this description, these reference points may be used in the manner in which they are defined in the 3GPP Specifications and may be modified in accordance with the exemplary embodiments described here. Furthermore, while these interfaces are termed reference points throughout this description, those skilled in the art will understood that these interfaces are not required to be direct wired or wireless connections, e.g., the interfaces may communicate via intervening hardware and/or software components. To provide an example, the UE 110 may exchange signals over the air with the gNB 120A. However, in the architecture 300 the UE 110 is shown as having a direct connection to the ECS 180. Those skilled in the art will understand that this connection is not a direct communication link between the UE 110 and the ECS 180. Instead, this is a connection that is facilitated by intervening hardware and software components. Thus, throughout this description the terms "connection," "reference point" and "interface" may be used interchangeably to describe the interfaces between the various components in the architecture 300 and the network arrangement 100.

Once connected, application data traffic 305 may flow between the AC 235 running on the UE 110 and the EAS 172 of the edge data network 170. The EAS 172 may be accessed through the core network 130 via uplink classifiers (CL) and branching points (NP) or in any other appropriate manner. Those skilled in the art will understand the variety of different types of operations and configurations relevant to an AC and an EAS.

The EEC 240 may be configured to provide supporting functions for the AC 235. For example, the EEC 240 may perform operations related to concepts such as, but not limited to, the discovery of EASs that are available in an edge data network and the retrieval and provisioning of configuration information that may enable the exchange of the application data traffic 305 between the AC 235 and the EAS 172. To differentiate the EEC 240 from other EECs, the EEC 240 may be associated with a globally unique value/ (e.g., EEC ID) that identifies the EEC 240. Further, reference to a single AC 235 and EEC 240 is merely provided for illustrative purposes, the UE 110 may be equipped with any appropriate number of application clients and EECs.

The edge data network 170 may also include an edge enabler server (EES) 174. The EES 174 may be configured to provide supporting functions to the EAS 172 and the EEC 240 running on the UE 110. For example, the EES 174 may perform operations related to concepts such as, but not limited to, provisioning configuration to enable the exchange of the application data traffic 305 between the UE 110 and the EAS 172 and providing information related to the EAS 172 to the EEC 240 running on the UE 110. Those skilled in the art will understand the variety of different types of operations and configurations relevant to an EES. Further, reference to the edge data network 170 including a single EAS 172 and a single EES 174 is merely provided for illustrative purposes. In an actual deployment scenario, an edge data network may include any appropriate EASs and EESs interacting with any number of UEs.

The ECS 180 may be configured to provide supporting functions for the EEC 240 to connect the EES 174. For example, the ECS 180 may perform operations related to concepts such as, but not limited to, provisioning of edge configuration information to the EEC 240. The edge configuration information may include the information for the EEC 240 to connect to the EES 174 (e.g., service area information, etc.) and the information for establishing a connection with the EES 174 (e.g., uniform resource identifier (URI)). Those skilled in the art will understand the variety of different types of operations and configurations relevant to an ECS.

In the network architecture 100 and the enabling architecture 300, the ECS 180 is shown as being outside of the edge data network 170 and the core network 130. In addition, the EAS 172 and the EES 174 are shown as being inside of the edge data network 170. However, these examples are merely provided for illustrative purposes. The EAS 172, the EES 174 and the ECS 180 may be deployed in any appropriate virtual and/or physical location (e.g., within the mobile network operator's domain or within a third party domain) and implemented via any appropriate combination of hardware, software and/or firmware.

An ACR procedure may be used to provide service continuity when an s-EAS is replaced with a t-EAS. To provide an example within the context of the architecture 300, the EAS 172 and the EES 174 represent serving entities. When an ACR procedure is triggered, EAS 172 would be a s-EAS and the EES 174 would be an s-EES. The ACR procedure may also involve the AC 235, EEC 240 and the ECS 180. In addition, there may be one or more target entities (e.g., t-EAS, t-EES, etc.) that are not shown in the enabling architecture 300. Application context for the AC 235 may be stored at the EAS 172. When ACR is triggered by one of the entities, the application context is transferred from the EAS 172 to a t-EAS (not pictured in the architecture 300).

There are multiple different types of methods for ACR procedures. The procedures may be different with regard to which entity is responsible for initiating the procedure, the tasks each entity is to perform and/or the sequence in which the tasks are performed. However, the procedures may not be compatible with one another. A successful ACR procedure happens when all of the entities involved support a common ACR method.

As will be described in more detail below, according to some aspects, the exemplary embodiments introduce a mechanism for selecting serving entities, which may eventually be an s-EAS and s-EES in an ACR procedure, and then selecting a t-EES and t-EAS for the ACR procedure such that all entities involved in the ACR procedure (e.g., AC, EEC, s-EES, s-EAS, t-EES, t-EAS, etc.) support a common type of ACR method. Under conventional circumstances, in one approach, the EEC, the s-EES and/or the t-EES may support all of the different types of 3GPP ACR methods so that there will be at least one method supported by all of the entities involved in the ACR procedure. However, this is a high-complexity approach and in an actual deployment scenario, it cannot be guaranteed that the entities actually support a common ACR method. Under conventional circumstances, in another approach, trial-and-error may be utilized. Whenever one of the entities detects a need for ACR, the entity may attempt to initiate ACR. In some instances, the ACR procedure may be successful. However, in other instances, the ACR procedure will fail because at least one of the other entities does not support the necessary functionality related to the initiated ACR procedure.

Under conventional circumstances, in some scenarios, a basic "service continuity supported" indication may be provided by the UE 110 during EAS discovery in the application client profile information element (IE) and a "service continuity supported" indication may be provided by the EAS to the EES during EAS registration in the EAS Profile IE. The EES may use this information to select an EAS that matches the UE and/or the EEC's requirement for service continuity. However, if several incompatible ACR methods are supported, this simple matching procedure is not sufficient to ensure that all entities involved in the ACR support a common type of ACR method.

The exemplary embodiments introduce mechanisms that enable the entities involved in an ACR procedure (e.g., AC, EEC, s-EAS, s-EES, t-EAS, t-EES, etc.) to indicate their capabilities related to ACR to the other entities so that when an ACR procedure is triggered by one of the entities, the EEC or s-EES may determine whether all the other entities to be involved in the ACR procedure support a specific ACR method. The capability information may be used during EES selection and EAS discovery to initially select serving entities and then select target entities that support an ACR method that matches the capabilities of the AC/EEC of the UE 110.

Figure 4:
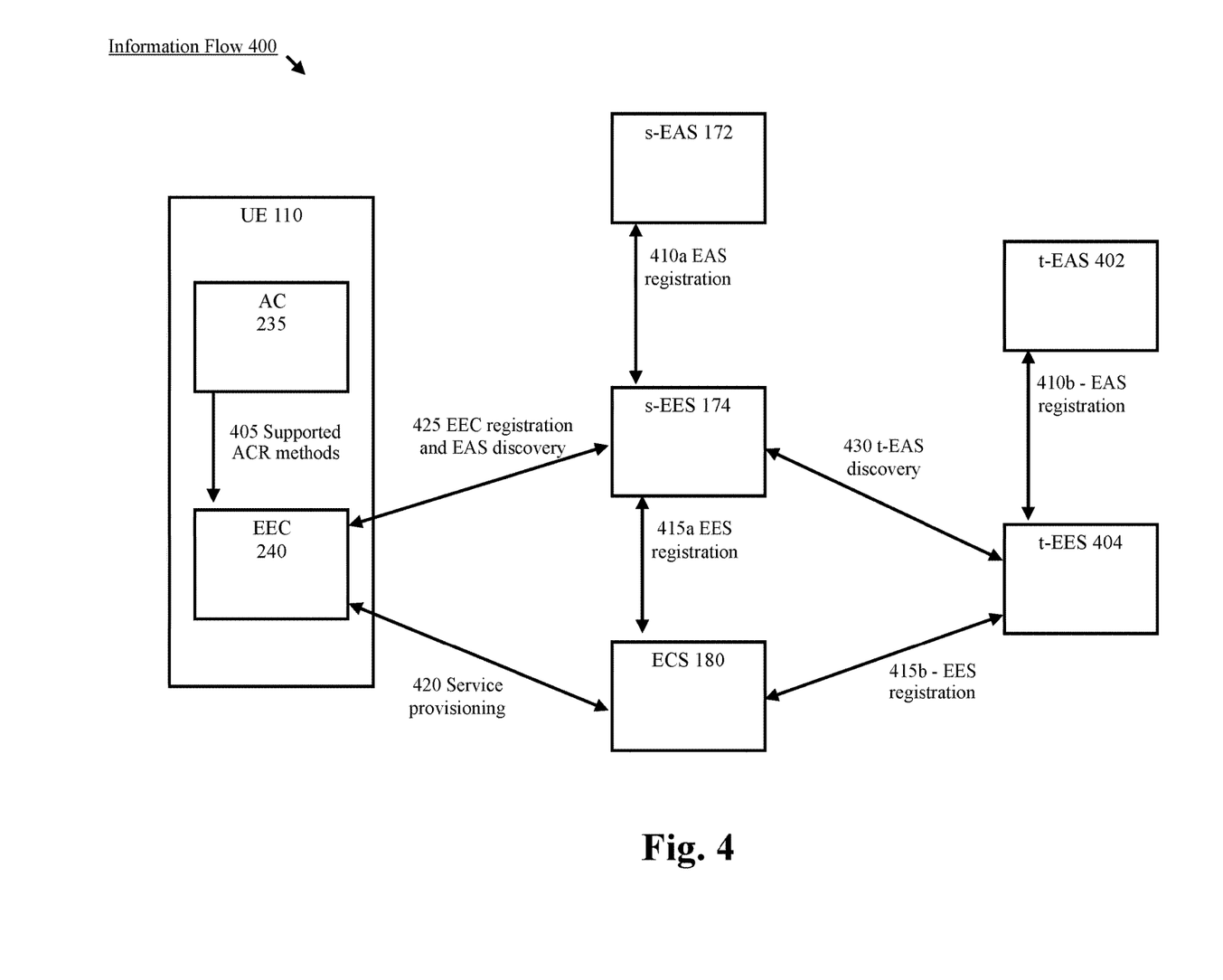
FIG. 4 shows an exemplary information flow for determining a common application context relocation (ACR) method according to various exemplary embodiments.

FIG. 4 shows an exemplary information flow 400 for determining a common ACR method according to various exemplary embodiments. The exemplary information flow shows the application layer entities from the enabling architecture 300 of FIG. 3. In addition, a t-EAS 402 and t-EES 404 are shown in the information flow 400.

The exemplary information flow 400 shows examples of how the exemplary enhancements related to determining a common ACR method may be incorporated into different aspects of the signaling between the entities of the edge application layer architecture such that any entity which can trigger ACR (e.g., EEC, s-EES, s-EAS, etc.) may determine in advance or during t-EAS discovery whether all entities involved in the ACR support a common ACR method.

The following exemplary embodiments are described with regard to five different ACR methods which are defined in clause 8.8.2 of 3GPP TS 23.558. In this description, these procedures may be used in the manner in which they are defined in the 3GPP Specifications and may be modified in accordance with the exemplary embodiments described here. These methods may be referred to below as "method 1," "method 2," "method 3," "method 4" and "method 5." Method 1 refers to an ACR procedure initiated by the EEC and ACs using EAS discovery, method 2 refers to an EEC executed ACR procedure via s-EES, method 3 refers to an s-EAS decided ACR scenario, method 4 refers to an s-EES executed ACR procedure and method 5 refers to an EEC executed ACR via t-EES. In some examples, the term s-EES initiated ACR may be used to refer to method 3 or method 4. However, the exemplary embodiments are not limited to these five procedures and may be utilized with any number of currently implemented ACR methods or future implementations of ACR methods.

In addition, the information flow 400 will reference various edge application enabling procedures that may be performed to establish a connection between the AC 235 of the UE 110 and the EAS 172 of the edge data network 170. The edge application enabling procedures may include, but are not limited to, service provisioning, EEC registration and EAS discovery. Once completed, application data may flow between the AC 235 and the EAS 172 an example of which is shown in the application layer architecture 300 for enabling edge application as shown in FIG. 3. An ACR procedure may then be performed to replace the s-EAS 172 with the t-EAS 402 and/or the s-EES 174 with the t-EES 404.

In 405, the AC 235 sends a message to the EEC 240 indicating which ACR methods are supported by the AC 235. For example, the AC 235 may send a message to the EEC 240 in response to being installed on the UE 110, launched and/or activated comprising a service continuity supported indication and an indication of the ACR methods that are supported by the AC 235. The message may be an edge service registration request or any other appropriate type of message that may be sent by the AC 235 to the EEC 240. At this time, the EEC 240 is aware of which ACR methods are supported by the EEC 240 itself and the AC 235.

In 410a, the EAS 172 registers with the EES 174. In this example, the EAS 172 and the EES 174 may be configured as an s-EAS and s-EES in a subsequent ACR procedure. During the registration procedure, the EAS 172 may send an EAS profile information element (IE) to the EES 174. The EAS profile IE may include the service continuity supported indication referenced above. In addition, the EAS 172 may indicate which ACR methods are supported by the EAS 172. The EES 174 may also indicate to the EAS 172 whether the EES 174 supports s-EES initiated ACR, e.g., method 3 or method 4. This indication may be provided in an EAS registration response or in any other appropriate message.

In 410b, the EAS 402 registers with the EES 404. The EAS 402 may register with the EES 404 in the same manner as the EAS 172 registers with the EES 170. Thus, the EAS 402 may send an EAS profile IE to the EES 404. The EAS profile IE may include the service continuity supported indication referenced above. In addition, the EAS 172 may indicate which ACR methods are supported by the EAS 172. In this example, the EAS 402 and the EES 404 will be target entities in a subsequent ACR procedure.

In 415a, the EES 174 registers with the ECS 180. During EES registration, the EES 174 may send one or more messages to the ECS 180 comprising a service continuity supported indication and an indication of the supported ACR methods at the EES 174 itself. Additionally, the one or more messages may comprise an indication of supported EEC context transfer methods at the EES 174 itself. In 415b, the EES 404 registers with the ECS 180. Like in the example provided above, during EES registration, the EES 404 may send one or more messages to the ECS 180 comprising a service continuity supported indication, an indication of the supported ACR methods at the EES 404 itself and, optionally, an indication of supported EEC context transfer methods at the EES 404 itself. At this time, neither the AC 235 nor the EEC 240 have communicated with any of the entities on the network side.

In 420, the EEC 240 performs a service provisioning procedure with the ECS 180 via the EDGE-4 reference point or any other appropriate connection. When the UE 110 wants to use edge computing services, the UE 110 may contact the ECS 180 to receive service provisioning data. The service provisioning data may include information such as, but not limited to, a list of EESs which are offering edge computing service and are geographically close to the UE 110 and for each EES a list of EASs registered to that EES. Thus, in the example 400, when the EEC 240 requests service provisioning data, it may include information identifying the EES 174 and/or the EAS 172.

For instance, the EEC 240 may receive an address (e.g., uniform resource identifier (URI), etc.) for the ECS 180. The address may be preconfigured at the EEC 240, provided by the AC 235 and/or provided by any other appropriate UE 110 or network component. The EEC 240 may then send a provisioning request to the ECS 180. The request may include parameters such as, but not limited to, a UE identifier, credentials received during authorization procedures and application client profile information. In response, the ECS 180 may determine that EES 174 is suitable for the parameters provided in the provisioning request. The ECS 180 may then send a provisioning response to the EEC 240 with edge computing configuration information such as, but not limited to, identification of the edge data network 170 and information for establishing a connection to the EES 174 (e.g., URI, IP address, etc.). The information regarding the EES 174 may also comprise a service continuity supported indication and an indication of the supported ACR methods at the EES 174 itself. The example service provisioning procedure described above is merely provided for illustrative purposes. The exemplary embodiments may apply to an EEC acquiring this type of information in any appropriate manner.

In 425, the EEC 240 performs EEC registration and EAS discovery with the EES 174. During either EEC registration or EAS discovery, the EEC 240 may send a service continuity supported indication to the EES 174 in an application client profile IE. In addition, the EEC 240 may also signal which ACR methods are supported by the AC 235 and which ACR methods are supported by the EEC 240. In some embodiments, the EEC 240 may use a single IE to provide the service continuity supported indication and the indication of the one or more ACR methods supported by the EEC 240 and a different IE to indicate the one or more ACR methods supported by the AC 235. However, the exemplary embodiments are not limited to this arrangement of IEs and may utilize any appropriate arrangement of IEs to provide the above referenced indications.

The EEC 240 may register with the EES 174 via the EDGE-1 reference point or any other suitable connection. The EEC registration procedure may be performed to provide information to the EES 174 that may be used to enable edge computing services. Each EEC at the UE 110 may be registered with one or more EESs on behalf of one or more ACs simultaneously. The EEC 240 may receive configuration information indicating whether EEC registration is to be performed with a particular EES from an edge computer service provider (ECSP). In some embodiments, the EEC 240 may register with several EESs. For example, if the EEC 240 is working for more than one AC or if the first EES is not able to provide edge services for the AC with the required latency or other key performance indictors (KPIs). The example EEC registration procedure described above is merely provided for illustrative purposes. The exemplary embodiments may apply to an EEC acquiring this type of information in any appropriate manner. The EEC 240 may perform EAS discovery with the EES 174 via the EDGE-1 reference point or any other suitable connection. Those skilled in the art will understand that EAS discovery is a procedure where the UE 110 discovers an address of an appropriate EAS. Accordingly, in this example, the EEC 240 may send a discovery request to the EES 174. In response, the EES 174 may send a discovery response to the EEC 240 to provide information that explicitly or implicitly indicates an address for the EAS 172. In some scenarios, the discovery response may indicate the address for multiple EASs and it is up to the EEC 240 to select one of the EASs.

In accordance with some ACR methods (e.g., method 3, 4), in 430, the s-EES 174 may perform a t-EAS 172 discovery procedure. During this discovery procedure the s-EES 174 may send one or more messages to the t-EES 404 comprising a service continuity supported indication and an indication of the supported ACR methods at the AC 235, EEC 240, s-EES 174 and s-EAS 172. In some examples, there may be a first IE indicating the one or more ACR methods supported by the AC 235, a second IE indicating the one or more ACR methods supported by the EEC 240, a third IE indicating the one or more ACR methods supported by the s-EES 174 and a fourth IE indicating the one or more ACR methods supported by the s-EAS 172. However, the exemplary embodiments are not limited to this arrangement of IEs and may utilize any appropriate arrangement of one or more IEs. The s-EES 174 may attempt to select t-EES and t-EAS for which at least one of the supported ACR methods is matching the supported ACR methods of the AC 235, EEC 240, s-EES 174 and s-EAS 172. Thus, the s-EES 174 may receive an address for one or more possible t-EASs. In this example, the s-EES 174 receives an address corresponding to the t-EAS 402.

In accordance with other ACR methods (e.g., method 1, 2, 5), the EEC 240 of the UE 110 may perform a discovery procedure to locate one or more potential t-EASs. This discovery procedure may be performed with the currently serving EES or a potential target EES to determine which EASs and/or EESs match the supported ACR methods of the AC 235, the EEC 240, s-EES 174 and s-EAS 172. In some embodiments, the EES 174 may inform the EEC 240 of only the common ACR methods where the AC 235 or EEC 240 initiates the ACR signaling procedure (e.g., method 1, 2, 5). This ensures that the EEC 240 is aware that the EEC 240 is able to use any of the ACR methods indicated by the network.

During a EAS discovery procedure for an EAS or a t-EAS, an EES may select one or more EASs with an EAS profile matching the application client profile, the service continuity required indication and the supported ACR methods indication. The EES may consider a supported ACR methods indication matching, if it has at least one supported ACR methods in common with the other entities (e.g., AC 235, EEC 240 and s-EES 174 for the case of EAS discovery or AC 235, EEC 240, s-EES 174 and s-EAS 172 for the case of t-EAS discovery). The EES may then attempt to find at least one ACR method common to the other entities. The EES may then inform the requesting entity about the common ACR methods in the EAS discovery response message.

The information flow 400 describes two different discovery procedures performed on behalf of a single AC 235. A first discovery procedure is performed to locate the EAS 172 and a second discovery procedure is performed to find the t-EAS 402. However, the exemplary embodiments are not limited to this type of scenario. For instance, on the UE 110 side, there may be multiple different ACs using the same EEC 240. On the network side, multiple EASs may be registered to a single EES. Thus, the EEC 240 may attempt to discover EASs for each of the ACs. If the EASs are registered to the same EES, a scenario may occur where multiple EASs that support ACR methods common to the other entities may be discovered using a single EAS discovery procedure. Otherwise, if at least one common ACR method is not identified by the network or the EEC 240 identifies that the ACs do not support a same ACR method, a separate EAS discovery procedure may be performed for each of the ACs. Alternatively, the at least one common ACR method identified by the network for a first AC may be different from the at least one common ACR method identified as a second AC and the UE 110 and the network may use different ACR methods for different ACs when the need for an ACR is determined.

In some ACR methods, the AC 235 and/or the EEC 240 may not be involved or only involved to a minor degree. In this type of scenario, each respective entity is assumed to support, by default, the respective ACR methods for which it is not involved in the signaling. This support may be signaled similar to the support of the other ACR methods as described herein. In other embodiments, this type of support is not signaling because the other entities already know based on configuration that the AC 235 and/or the EEC 240 supports the respective ACR method.

When the EEC 240 signals to the EES during EEC registration or EAS discovery (e.g., 425) or when the EEC signals to the ECS 180 during service provisioning (e.g., 420), the EEC 240 may provide a service continuity supported indication and indicate which ACR methods are supported by the AC 235 and the EEC 240. In some embodiments, this information may be signaled using a bitmap which may be part of the service continuity indication.

Figure 5:
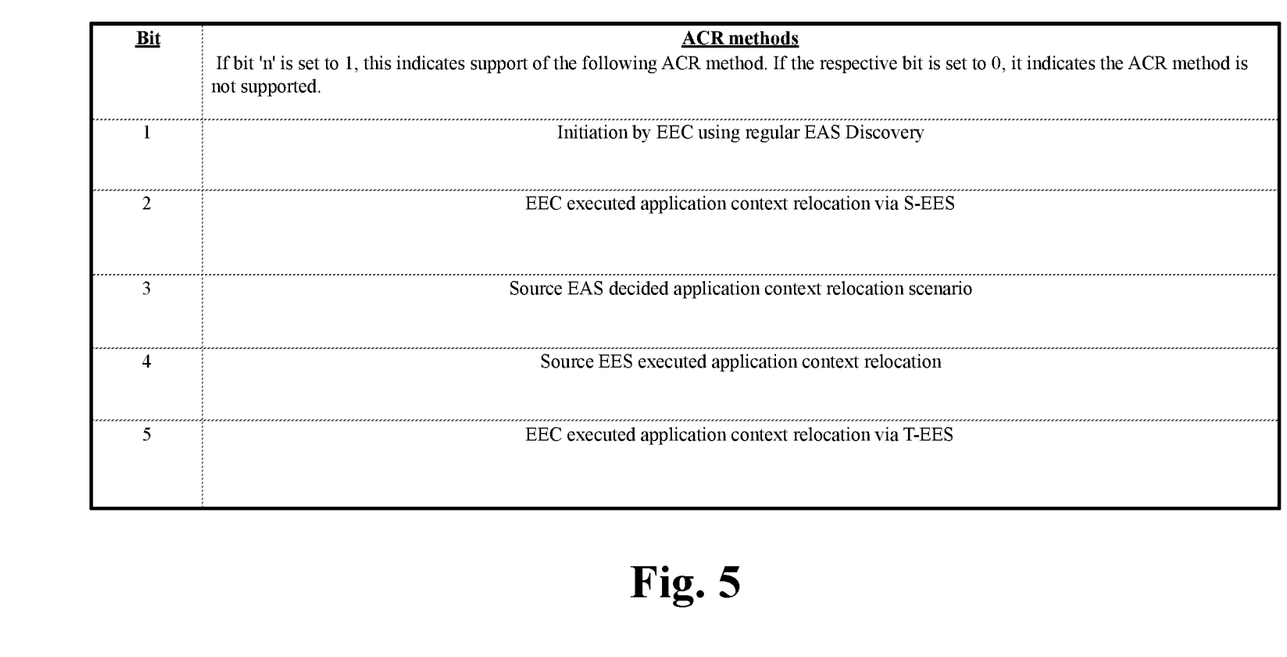
FIG. 5 shows a Table illustrating an example bitmap for indicating supported ACR methods according to various exemplary embodiments.

FIG. 5 shows a Table 500 illustrating an example bitmap for indicating supported ACR methods. If bit 'n' is set to 1, this indicates that the corresponding ACR method is supported and if bit 'n' is set to 0, this indicates that the corresponding ACR method is not supported.

In this example, since there are 5 ACR methods, n is equal to 5. If bit 1 is set to 1, this indicates that the ACR procedure initiated by the EEC and ACs using EAS discovery (e.g., method 1) is supported. If bit 1 is set to 0, this indicates that ACR procedure initiated by the EEC and ACs using EAS discovery is not supported. If bit 2 is set to 1, this indicates that EEC executed ACR relocation via s-EES (e.g., method 2) is supported. If bit 2 is set to 0, this indicates that EEC executed ACR relocation via s-EES is not supported. If bit 3 is set to 1, this indicates that EAS decided ACR scenario (e.g., method 3) is supported. If bit 3 is set to 0, this indicates that EAS decided ACR scenario is not supported. If bit 4 is set to 1, this indicates that an s-EES executed ACR procedure (e.g., method 4) is supported. If bit 4 is set to 0, this indicates that an s-EES executed ACR procedure is not supported. If bit 5 is set to 1, this indicates that an EEC executed ACR via t-EES (e.g., method 5) is supported. If bit 4 is set to 0, this indicates that an EEC executed ACR via t-EES is not supported.

In some embodiments, the EEC 240 may indicate preferences for one or more of the supported ACR methods. The EES 174 may take the preferences into account when selecting EASs for inclusion in the EAS discovery response message. In one approach, the preferences may be indicated using multiple bitmaps in an IE. A first bitmap may indicate the ACR methods of highest preference, the second bitmap may indicate the ACR methods with the second highest preference, etc.

Figure 6A:
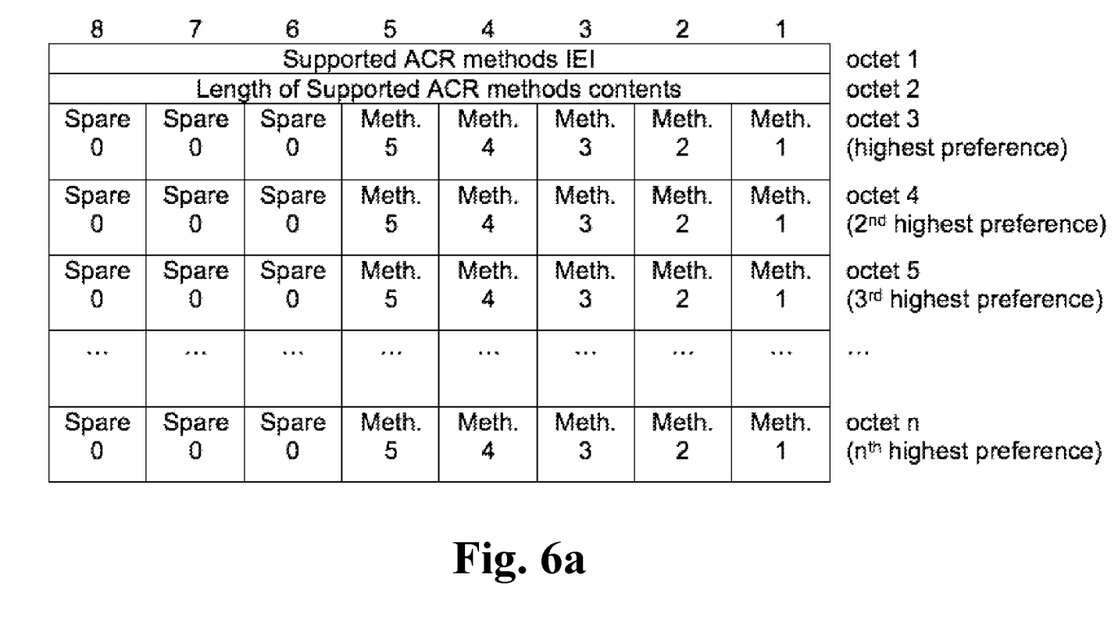
FIGS. 6a-6c show examples of using multiple bitmaps to indicate preferred ACR methods according to various exemplary embodiments.
Figure 6B:
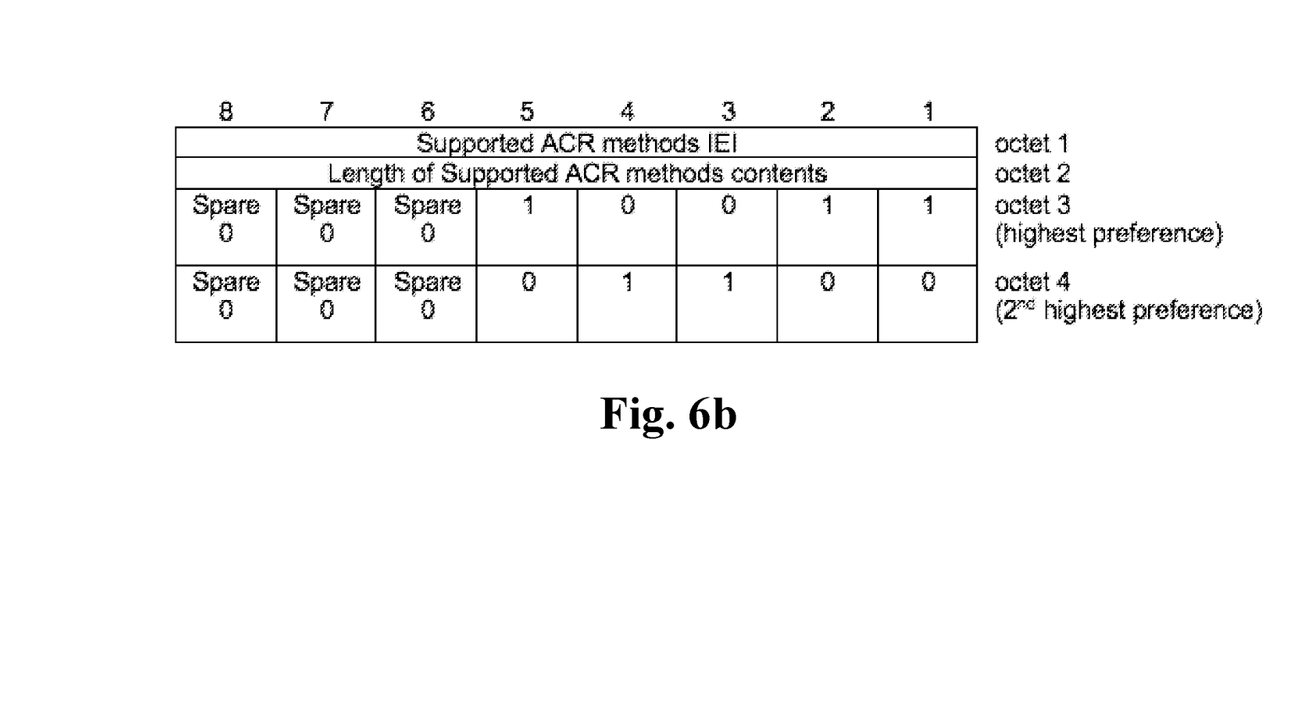
Figure 6C:
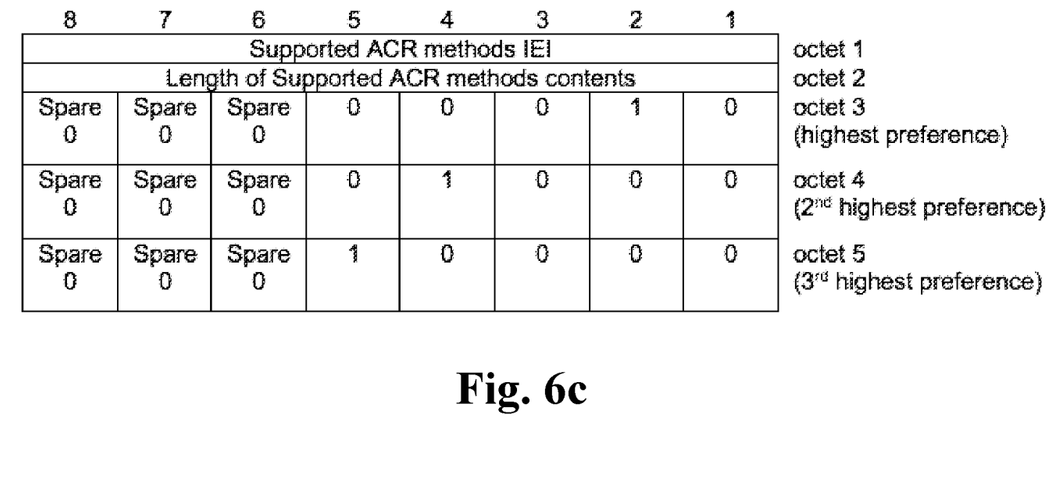

FIGS. 6a-6c show examples of using multiple bitmaps to indicate preferred ACR methods. FIG. 6a shows an example of how multiple bit maps may be arranged. Octet 3 may be used to indicate that one or more ACR methods have the highest priority, octet 4 may be used to indicate that one or more ACR methods have the second highest priority, octet 5 may be used to indicate that one or more ACR methods have the third highest priority and octet n may be used to indicate that one or more ACR methods have the nth highest priority. When a bit corresponding to a particular ACR method is set to 1, it may indicate that the corresponding ACR method (e.g., methods 1-5) has been assigned the corresponding priority. When a bit corresponding to a particular ACR method is set to 0, it may indicate that the corresponding ACR method has not been assigned the corresponding priority.

FIG. 6b shows an example where the EEC 240 indicates that it has preference for any of the ACR methods 1, 2 and 5 (without priority between these methods) over any of other ACR methods, e.g., methods 3 and 4. A comparison of FIGS. 6a and 6b will show that the bits set to 1 in octet 3 correspond to methods 1, 2 and 5 and the bits set to 0 in octet 3 correspond to methods 4 and 3. Thus, methods 1, 2 and 5 are assigned the highest priority by the EEC 240 and methods 3 and 4 are assigned the second highest priority.

FIG. 6c shows an example where the EEC 240 indicates that it has a highest preference for ACR method 2, the second highest preference for ACR method 4 and the third highest priority for ACR method 5. However, the exemplary embodiments are not limited to a bitmap. The exemplary embodiments may utilize other encodings such as an ordered list of methods in a decreasing order of preference or any other appropriate technique.

As indicated above, when an EAS registers with an EES, the EAS may indicate whether service continuity is supported and which ACR methods are supported by the EAS. In some embodiments, there may be an additional indication signaled from the EAS to the EES and the towards the EEC indicating whether the EAS supports ACT between an s-EAS and t-EAS in a forward direction (e.g., the s-EAS pushes the application context to the t-EES) or whether the EAS supports ACT in backwards direction (e.g., the t-EAS retrieves the application context from the s-EAS. This information may be used by the EEC 240 and AC 235 to decide whether any of the ACT methods 1, 2 or 5 may be used. For this approach, 2 additional bits may be added to the above referenced bitmap.

There may be a scenario where an entity on the UE 110 side is not directly involved in the ACR procedure for a specific ACR method. For example, the AC 235 may not be involved in ACR methods 2, 4 and 5. In this type of scenario, the AC 235 and/or EEC 240 may nevertheless indicate that these ACR methods are supported. This explicit indication may allow the entity to indicate a higher or lower preference for these ACR methods compared to the other ACR methods where the AC 235 is involved.

In some embodiments, when the EEC 240 does not signal preference for ACR methods, the entity may not indicate support for methods for which it is not involved in the ACR procedure. The other entities will then by configuration assume that the first entity supports the respective ACR methods.

As indicated above, when an EES performs EES registration with an ECS, the EES may indicate whether service continuity is supported and which ACR methods are supported by the EES. In some embodiments, an additional indication may be signalling from the EES to the ECS and then towards the EEC and other EESs. This additional indication may indicate whether the EES supports EEC context transfer between an s-EES and a t-EES in a forward direction (e.g., s-EES pushes the EEC context to the t-EES with a signalling message) or whether the EES supports the EEC context transfer in the backwards direction (e.g., t-EES retrieves the EEC context from the s-EES with a signalling message). These indications may be provided in the form of a bitmap which may be part of the service continuity support indication in the EES profile IE. When a first bit is set to 1, it may indicate that the EES supports EEC context transfer between s-EES and t-EES in forward direction. When the first bit is set to 0, it may indicate that the EES does not support EEC context transfer between s-EES and t-EES in forward direction. When a second bit is set to 1, it may indicate that the EES supports EEC context transfer between s-EES and t-EES in a backwards direction. When the second bit is set to 0, it may indicate that the EES does not support EEC context transfer between s-EES and t-EES in the backwards direction.

Subsequently, when the EEC performs service provisioning with the ECS, the ECS may also indicate for each EES it includes in the service provisioning response or service provisioning notification message whether each EES supports service continuity and which ACR methods are supported by the EES. If the EES supports service continuity, a further indication may be provided to indicate whether the EES supports EEC context transfer between s-EES and t-EES in forward or backward direction or both.

The EEC may use this information about the EESs when selecting an s-EES for registration or EAS discovery or later when selecting a t-EES for t-EAs discovery during any of the ACR methods 1, 2 or 5. If the EEC wants to use ACR method 1 or 5, the EEC may use this information to select an EES supporting EEC context transfer between s-EES and t-EES in backward direction or if the EEC wants to use method 2, to select an EES supporting EEC context transfer between s-EES and t-EES in forward direction. The same information about possible t-EESs may also be retrieved by the s-EES from the ECS during a retrieve t-EES procedure and used subsequently when selecting a t-EES for t-EAs discovery during any of the ACR methods 3 or 4.

In some embodiments, an AC profile may be modified to indicate which ACR methods are supported by both the AC 235 and the EEC 240. For instance, the service continuity support IE in the AC profile may be configured to indicate which ACR methods are supported by the AC 235 and which ACR methods are supported by the EEC 240, or a new IE may be introduced for this purpose. The AC profile includes information about the AC 235 and is used to determine services and service characteristics. The AC profile may be included by the UE 110 in messages towards the ECS 180, e.g., service provisioning request, service provisioning subscription request, service provisioning update request, etc. The AC profile may also be included in messages towards the EES 174, e.g., EEC registration request, EAS discovery request (in the EAS discovery filters IE).

Similarly, as indicated above, the EAS profile may be modified to indicate which ACR methods are supported by the EAS and/or EES. For instance, the service continuity support IE in the EAS profile may be configured to indicate which ACR methods are supported by EAS or, if the IE is sent by the EES to the EEC, which ACR methods are supported by both the EAS and the EES. In another example, a new IE may be introduced for this purpose. The EAS profile may be included by the EAS in messages provided towards the EES, e.g., the EAS registration request, the EAS registration update request, etc. The EAS profile may also be included by the EAS in messages towards the EEC, e.g., EAs discovery response, EAS discovery notification, etc.

Like the EAS profile, the EES profile may be modified to indicate which ACR methods are supported by the EES. The EES profile include information about the EES and the services it provides. For instance, the service continuity support IE may be configured to indicate which ACR methods are supported by the EES. This IE may also indicate which methods of the EEC context transfer are supported by the EES. In another example, a new IE may be introduced for this purpose. The EES profile may be included by the EES in messages towards the ECS, e.g., EES registration request, EES registration update request, etc.

EAS discovery filters may also be modified to indicate which ACR methods are supported by the AC 235 and by the EEC 240. For instance, the service continuity support IE may be configured to indicate which ACE methods are supported by both the AC 235 and by the EEC 240.

A service provisioning response may also be modified to indicate which EEC context transfer methods are supported by the EES. For instance, the service continuity support IE may be configured to indicate which methods of EEC context transfer are supported by the EES. The service provisioning notification may be modified in a similar manner. For instance, the service continuity support IE may be configured to indicate which methods of EEC context transfer are supported by the EES.

EXAMPLES

In a first example, a processor of a user equipment (UE) operating as an edge enabler client (EEC) is configured to perform operations comprising receiving, from an edge configuration server (ECS), a message comprising information for one or more edge enabler servers (EESs), wherein the information for each EES comprises whether the EES supports service continuity and one or more ACR methods supported by the EES and selecting one of the EESs to perform an operation with based on the information.

In a second example, the processor of the first example, wherein the message is one of a service provisioning response message or a service provisioning notification message.

In a third example, the processor of the first example, wherein the selected EES is a source EES (s-EES) and the operation is one of an s-EES registration or a source edge application server (s-EAS) discovery.

In a fourth example, the processor of the first example, wherein the selected EES is a target EES (t-EES) and the operation is a target EAS (t-EAS) discovery.

In a fifth example, an edge enabler server (EES) of an edge data network (EDN) is configured to perform operations comprising receiving, from one or more edge application servers (EAS), a first message indicating whether each EAS supports service continuity and one or more application context relocation (ACR) methods supported by each of the EASs that support service continuity and receiving, from an edge enabler client (EEC) of a user equipment (UE), a second message indicating that an application client (AC) of the UE requesting service from the EDN requires service continuity support from the EDN, one or more ACR methods supported by the AC and one or more ACR methods supported by the EEC.

In a sixth example, the EES of the fifth example, wherein the operations further comprise transmitting, to an edge configuration server (ECS), a third message comprising whether the EES supports service continuity and one or more ACR methods supported by the EES.

In a seventh example, the EES of the sixth example, wherein the third message includes an EES profile.

In an eighth example, the EES of the seventh example, wherein the EES profile is transmitted during one of an EES Registration Request or an EES Registration Update Request.

In a ninth example, an edge configuration server (ECS) is configured to perform operations comprising receiving, from one or more edge enabler servers (EESs), a first message comprising a first indication indicating whether each EES supports service continuity and one or more application context relocation (ACR) methods supported by each of the EESs that support service continuity, receiving, from an edge enabler client (EEC) of a user equipment (UE), a second message that an application client (AC) of the UE requesting service from one or more edge data networks (EDN) requires service continuity support from the one or more EDNs, one or more ACR methods supported by the AC and one or more ACR methods supported by the EEC and transmitting, to the EEC, a third message comprising each EES that supports service continuity and one or more ACR methods supported by the EES.

In a tenth example, the ECS of the ninth example, wherein the third message is a service provisioning response message.

In an eleventh example, the ECS of the ninth example, wherein the third message is a service provisioning notification message.

In a twelfth example, the ECS of the ninth example, wherein the first message comprises an EES profile that includes the first indication In a thirteenth example, the ECS of the twelfth example, wherein the EES profile is received during one of an EES registration request or an EES registration update request.

In a fourteenth example, the ECS of the ninth example, wherein the second message comprises an application client profile.

In a fifteenth example, the ECS of the fourteenth example, wherein the AC profile is received during one of a service provisioning request, a service provisioning subscription request, or a service provisioning subscription update request.

In a sixteenth example, the ECS of the ninth example, wherein the operations further comprise receiving, from one of the EESs operating as a source EES (s-EES), a request to identify one or more target EESs (t-EESs) that support service continuity and that support one or more ACR methods that are supported by all of the AC, the EEC, the s-EES and a source edge application server (s-EAS).

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described methods may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) operating as an edge enabler client (EEC) and configured to perform operations comprising:
    determining one or more application context relocation (ACR) methods supported by an application client (AC) of the UE; and
    transmitting, to an edge data network (EDN), a message comprising a first indication that the AC requires service continuity support, a second indication of one or more ACR methods supported by the AC and a third indication of one or more ACR methods supported by the EEC, wherein the first indication comprises an AC profile IE and the second indication comprises a AC service continuity support IE included in the AC profile IE and the AC profile IE includes one or more bitmaps indicating the one or more ACR methods supported by the AC.

2. The processor of claim 1, wherein the transmitting the message to the EDN comprises:
    transmitting the message to an edge enabler server (EES) during an EEC registration procedure or an edge application server (EAS) discovery procedure.

3. The processor of claim 2, wherein the operations further comprise:
    receiving, from the EES, a second message identifying at least one EAS that supports service continuity and one or more ACR methods that are supported by the EAS.

4. The processor of claim 3, wherein the operations further comprise:
    selecting, for the purpose of receiving edge services, the at least one EAS that supports service continuity and one or more ACR methods that are supported by all of the AC, EEC, EES and EAS based on, at least, the second message.

5. The processor of claim 4, wherein the selected one of the at least one EAS is a source EAS (s-EAS), the EES is a source (s-EES) and wherein the operations further comprise:
    transmitting a third message to a target EES (t-EES) during a target edge application server (t-EAS) discovery procedure, wherein the third message comprises the one or more ACR methods supported by the AC, the one or more ACR methods supported by the EEC, one or more ACR methods supported by the s-EES and one or more ACR methods supported by the s-EAS.

6. The processor of claim 5, wherein the operations further comprise:
    receiving, from the t-EES, a fourth message identifying at least one t-EAS that supports service continuity and one or more ACR methods supported by the t-EAS.

7. The processor of claim 6, wherein the operations further comprise:
    selecting, for the purpose of receiving edge services, at least one t-EAS that supports service continuity and the one or more ACR methods that are supported by all of the AC, the EEC, the s-EES, the s-EAS, the t-EES and the t-EAS based on, at least, the fourth message.

8. The processor of claim 1, wherein transmitting the message to the EDN comprises:
    transmitting the message to an edge configuration server (ECS) during a service provisioning procedure.

9. An edge enabler server (EES) of an edge data network (EDN) configured to perform operations comprising:
    receiving, from one or more edge application servers (EAS), a first message indicating whether each EAS supports service continuity and one or more application context relocation (ACR) methods supported by each of the EASs that support service continuity; and
    receiving, from an edge enabler client (EEC) of a user equipment (UE), a second message indicating that an application client (AC) of the UE requesting service from the EDN requires service continuity support from the EDN, one or more ACR methods supported by the AC and one or more ACR methods supported by the EEC, wherein the second message includes an AC profile and the AC profile includes one or more bitmaps indicating the one or more ACR methods supported by the AC.

10. The EES of claim 9, wherein the first message includes an EAS profile.

11. The EES of claim 9, wherein the second message is received during an EEC registration procedure or an EAS discovery procedure.

12. The EES of claim 11, wherein the operations further comprise:

determining at least one EAS that supports service continuity and one or more ACR methods that are supported by all of the AC, the EEC, the EES and the EAS based on at least the first indication and the second indication; and transmitting, to the EEC, a third message identifying the at least one EAS that supports service continuity and the one or more ACR methods that are supported by the EAS.

13. The EES of claim 9, wherein the EES is operating as a target EES (t-EES), the second message is received during a target edge application server (t-EAS) discovery procedure, and the one or more ACR methods included in the second message are ACR methods supported by all of the AC, the EEC, a source EES (s-EES) and a source EAS (s-EAS).

14. The EES of claim 13, wherein the operations further comprise:

determining at least one t-EAS that supports service continuity and one or more ACR methods that are supported by all of the AC, the EEC, the s-EES, the s-EAS, the t-EES and the t-EAS based on at least the first message and the second message; and transmitting a third message identifying the at least one t-EAS that supports service continuity and the one or more ACR methods that are supported by the t-EAS.

15. The EES of claim 9, wherein the EES is operating as a source EES (s-EES), the EAS is a source EAS (s-EAS) and wherein the operations further comprise:

determining the AC should relocate to a new EAS;

transmitting, to an edge configuration server (ECS), a third message of the one or more ACR methods supported by the AC, one or more ACR methods supported by the EEC, one or more ACR methods supported by the s-EES and one or more ACR methods supported by the s-EAS;

receiving, from the ECS, a fourth message of at least one target EES (t-EES) that supports service continuity and one or more ACR methods supported by the t-EES; and performing a target EAS (t-EAS) discovery procedure to select a t-EAS that supports service continuity and the one or more ACR methods that are supported by all of the AC, the EEC, the s-EES, the s-EAS, the t-EES and the t-EAS based on, at least, the fourth message.

16. The EES of claim 9, wherein the operations further comprise:

transmitting, to an edge configuration server (ECS), a third message comprising whether the EES supports service continuity and one or more ACR methods supported by the EES.

17. An edge configuration server (ECS) configured to perform operations comprising:

receiving, from one or more edge enabler servers (EESs), a first message comprising a first indication indicating whether each EES supports service continuity and one or more application context relocation (ACR) methods supported by each of the EESs that support service continuity;

receiving, from an edge enabler client (EEC) of a user equipment (UE), a second message that an application client (AC) of the UE requesting service from one or more edge data networks (EDN) requires service continuity support from the one or more EDNs, one or more ACR methods supported by the AC and one or more ACR methods supported by the EEC, wherein the second message includes an AC profile and the AC profile includes one or more bitmaps indicating the one or more ACR methods supported by the AC; and transmitting, to the EEC, a third message comprising each EES that supports service continuity and one or more ACR methods supported by the EES.

\* \* \* \* \*